United States Patent
Mou et al.

(10) Patent No.: US 12,154,589 B2
(45) Date of Patent: Nov. 26, 2024

(54) SYSTEMS AND METHODS FOR PROCESSING BI-MODE DUAL-CHANNEL SOUND DATA FOR AUTOMATIC SPEECH RECOGNITION MODELS

(71) Applicant: Optum, Inc., Minnetonka, MN (US)

(72) Inventors: James J. Mou, Eden Prairie, MN (US); Jun Li, Minnetonka, MN (US); Julie Zhu, Maple Grove, MN (US)

(73) Assignee: Optum, Inc., Minnetonka, MN (US)

( * ) Notice: Subject to any disclaimer, the term of this patent is extended or adjusted under 35 U.S.C. 154(b) by 163 days.

(21) Appl. No.: 17/930,567

(22) Filed: Sep. 8, 2022

(65) Prior Publication Data
US 2024/0087592 A1    Mar. 14, 2024

(51) Int. Cl.
*G10L 25/21* (2013.01)
*G10L 15/187* (2013.01)
*G10L 15/197* (2013.01)
*G10L 15/26* (2006.01)
*G10L 25/18* (2013.01)
*G10L 25/45* (2013.01)

(52) U.S. Cl.
CPC ............ *G10L 25/21* (2013.01); *G10L 15/187* (2013.01); *G10L 15/197* (2013.01); *G10L 15/26* (2013.01); *G10L 25/18* (2013.01)

(58) Field of Classification Search
USPC .................................................... 704/1–504
See application file for complete search history.

(56) References Cited

U.S. PATENT DOCUMENTS

| | | | |
|---|---|---|---|
| 10,546,593 B2 | 1/2020 | Wung et al. | |
| 10,735,887 B1 | 8/2020 | McElveen et al. | |
| 10,986,437 B1 | 4/2021 | Pan et al. | |
| 11,017,763 B1 * | 5/2021 | Aggarwal | G10L 13/08 |
| 11,133,011 B2 | 9/2021 | Watanabe et al. | |
| 11,217,235 B1 | 1/2022 | Chu et al. | |
| 11,289,109 B2 | 3/2022 | Deng et al. | |
| 11,562,733 B2 * | 1/2023 | Hannun | G06N 3/044 |

(Continued)

FOREIGN PATENT DOCUMENTS

| | | | | |
|---|---|---|---|---|
| CN | 108630193 B | * | 10/2020 | ............. G10L 15/02 |
| WO | WO-2018171257 A1 | * | 9/2018 | ............. G10L 15/02 |

OTHER PUBLICATIONS

A. Hannan, C. Case, J. Casper, B. Catanzaro, G. Diamos, E. Elsen, et al., "Deep Speech: Scaling Up End-To-End Speech Recognition," arXiv preprint arXiv:1412.5567v2 [cs.CL], Dec. 19, 2014, pp. 1-12.

(Continued)

*Primary Examiner* — Marcus T Riley
(74) *Attorney, Agent, or Firm* — ALSTON & BIRD LLP

(57) ABSTRACT

Various embodiments of the present disclosure provide methods, apparatus, systems, computing devices, computing entities, and/or the like for pre-processing dual-channel voice data for an automatic speech recognition mode. The method comprises creating one or more spectrograms for each channel of the dual-channel voice data by applying fast Fourier transform and generating power spectral density. The one or more balanced power spectrograms are created by merging the spectrograms of the channels, and are provided as input for acoustic and language processing by an automatic speech recognition machine learning model.

20 Claims, 8 Drawing Sheets

(56) References Cited

U.S. PATENT DOCUMENTS

| | | | | |
|---|---|---|---|---|
| 11,605,081 | B2* | 3/2023 | Yu | G06Q 20/4014 |
| 2015/0193431 | A1* | 7/2015 | Stoytchev | G16B 20/20 |
| | | | | 704/9 |
| 2019/0371295 | A1* | 12/2019 | He | G10L 17/00 |
| 2019/0371298 | A1* | 12/2019 | Hannun | G06N 3/044 |
| 2020/0090661 | A1 | 3/2020 | Ackerman et al. | |
| 2024/0087592 | A1* | 3/2024 | Mou | G10L 15/02 |

OTHER PUBLICATIONS

Alex Graves and N. Jaitly, "Towards End-To-End Speech Recognition With Recurrent Neural Networks," In Proceedings of the 31st International Conference on Machine Learning (ICML-14), ACM, Jun. 18, 2014, pp. 1764-1772, available online: http://proceedings.mlr.press/v32/graves14.pdf.

Amodei, Dario et al., "Deep Speech 2: End-To-End Speech Recognition In English and Mandarin," In Proceedings of the 33rd International Conference on Machine Learning, (Year: 2016), JMLR, vol. 48, pp. 173-182, New York, NY, USA.

López-Espejo, Iván et al. "Dual-Channel Spectral Weighting For Robust Speech Recognition In Mobile Devices," Digital Signal Processing, Apr. 1, 2018, vol. 75, Issue C, pp. 13-24, DOI: 10.1016/j.dsp.2017.12.011.

Mou, James et al. "Effects of Number of Filters of Convolutional Layers on Speech Recognition Model Accuracy," In Proceedings of the 19th IEEE International Conference on Machine Learning and Applications (ICMLA), pp. 971-978, Dec. 14, 2020, DOI: 10.1109/ICMLA51294.2020.00158, 2020.

Ruiz, Pablo D. et al. "Depth-Resolved Whole-Field Displacement Measurement Using Wavelength Scanning Interferometry," Journal of Optics A: Pure and Applied Optics, vol. 6, pp. 679-683, May 26, 2004, DOI: 10.1088/1464-4258/6/7/004.

Sainath, Tara N. et al. "Convolutional, Long Short-Term Memory, Fully Connected Deep Neural Networks," In Proceedings of the 2015 IEEE International Conference on Acoustics, Speech and Signal Processing (ICASSP) Apr. 19, 2015, pp. 4580-4584, IEEE, available online: storage.googleapis.com/pub-tools-public-publication-data/pdf/43455.pdf.

Sun, Xu et al. "Feature-Frequency-Adaptive On-Line Training For Fast and Accurate natural Language Processing," Association for Computational Linguistics, vol. 40, No. 3, pp. 563-586, Sep. 1, 2014, DOI: 10.1162/COLL_a_00193.

Vafeiadis, Anastasios et al. "Two-Dimensional Convolutional Recurrent Neural Networks For Speech Activity Detection," International Speech Communication Association, pp. 2045-2049, Sep. 15, 2019, DOI: 10.21437/Interspeech.2019-1354.

Wang, Xiaofei et al. Exploring End-To-End Multi-Channel ASR With Bias Information For Meeting Transcription, arXiv Preprint arXiv:2011.03110v2 [eess.AS], Nov. 25, 2020, (8 pages).

Woodcock, Rebecca Woodcock et al. "Burg Algorithm For Enhancing Measurement Performance In Wavelength Scanning Interferometry," Surface Topography: Metrology and Properties, vol. 4, No. 024003, Feb. 19, 2016, pp. 1-8, DOI: 10.1088/2051-672X/4/2/024003.

* cited by examiner

800

The is:
YOU KNOW THIS AND THE PURPOSE OF THIS CALL TODAY IS
TO GIVE YOU SOME UPDATED INFORMATION ABOUT YOUR HOUSECALLS VISIT BUT FIRST
CAN YOU UMMM VERIFY YOUR DATE OF BIRTH AND ADDRESS FOR ME PLEASE YES

Word Error Rate of the model for this audio sample is: 14.28%
Word Accuracy of the model for this audio sample is: 85.72%

FIG. 8

SYSTEMS AND METHODS FOR PROCESSING BI-MODE DUAL-CHANNEL SOUND DATA FOR AUTOMATIC SPEECH RECOGNITION MODELS

BACKGROUND

Various embodiments of the present disclosure address technical challenges related to transcribing audio files and provide solutions to address the reliability shortcomings of existing automatic speech recognition technology.

BRIEF SUMMARY

In general, various embodiments of the present disclosure provide methods, apparatus, systems, computing devices, computing entities, and/or the like for performing speech recognition processing.

In accordance with one aspect, a method is provided. In one embodiment, the method comprises: receiving dual-channel voice data; for each channel of the dual-channel voice data, extracting one or more data sequences in frequency domain from the dual-channel voice data over one or more sliding time frame windows by applying fast Fourier transformation to the dual-channel voice data; generating one or more spectrograms for each channel, a spectrogram comprising a power spectral density (PSD) waveform obtained by performing one or more forward linear prediction estimates on the one or more data sequences; determining peak power of each of the one or more sliding time frame windows for each channel; determining a most frequent power (MFP) based at least in part on the peak power of the one or more sliding time frame windows for each channel; generating one or more balanced input spectrograms based at least in part on the one or more spectrograms of each channel and the most frequent power for each channel; generating, using an acoustic machine learning model, character probabilities based at least in part on the one or more balanced input spectrograms; generating, using a language machine learning model, a transcription output based at least in part on the character probabilities; generating, using a natural language processing machine learning model and based at least in part on the transcription output, a natural language processing output for the dual-channel voice data; and performing, using the one or more processors, one or more prediction-based actions based at least in part on the natural language processing output.

In accordance with another aspect, an apparatus comprising at least one processor and at least one memory including computer program code is provided. In one embodiment, the at least one memory and the computer program code may be configured to, with the processor, cause the apparatus to: receive dual-channel voice data; for each channel of the dual-channel voice data, extract one or more data sequences in frequency domain from the dual-channel voice data over one or more sliding time frame windows by applying fast Fourier transformation to the dual-channel voice data; generate one or more spectrograms for each channel, a spectrogram comprising a power spectral density (PSD) waveform obtained by performing one or more forward linear prediction estimates on the one or more data sequences; determine peak power of each of the one or more sliding time frame windows for each channel; determine a most frequent power (MFP) based at least in part on the peak power of the one or more sliding time frame windows for each channel; generate one or more balanced input spectrograms based at least in part on the one or more spectrograms of each channel and the most frequent power for each channel; generate, using an acoustic machine learning model, character probabilities based at least in part on the one or more balanced input spectrograms; generate, using a language machine learning model, a transcription output based at least in part on the character probabilities; generate, using a natural language processing machine learning model and based at least in part on the transcription output, a natural language processing output for the dual-channel voice data; and perform, using the one or more processors, one or more prediction-based actions based at least in part on the natural language processing output.

In accordance with yet another aspect, a computer program product is provided. The computer program product may comprise at least one computer-readable storage medium having computer-readable program code portions stored therein, the computer-readable program code portions comprising executable portions configured to: receive dual-channel voice data; for each channel of the dual-channel voice data, extract one or more data sequences in frequency domain from the dual-channel voice data over one or more sliding time frame windows by applying fast Fourier transformation to the dual-channel voice data; generate one or more spectrograms for each channel, a spectrogram comprising a power spectral density (PSD) waveform obtained by performing one or more forward linear prediction estimates on the one or more data sequences; determine peak power of each of the one or more sliding time frame windows for each channel; determine a most frequent power (MFP) based at least in part on the peak power of the one or more sliding time frame windows for each channel; generate one or more balanced input spectrograms based at least in part on the one or more spectrograms of each channel and the most frequent power for each channel; generate, using an acoustic machine learning model, character probabilities based at least in part on the one or more balanced input spectrograms; generate, using a language machine learning model, a transcription output based at least in part on the character probabilities; generate, using a natural language processing machine learning model and based at least in part on the transcription output, a natural language processing output for the dual-channel voice data; and perform, using the one or more processors, one or more prediction-based actions based at least in part on the natural language processing output.

BRIEF DESCRIPTION OF THE DRAWINGS

Figure 1:
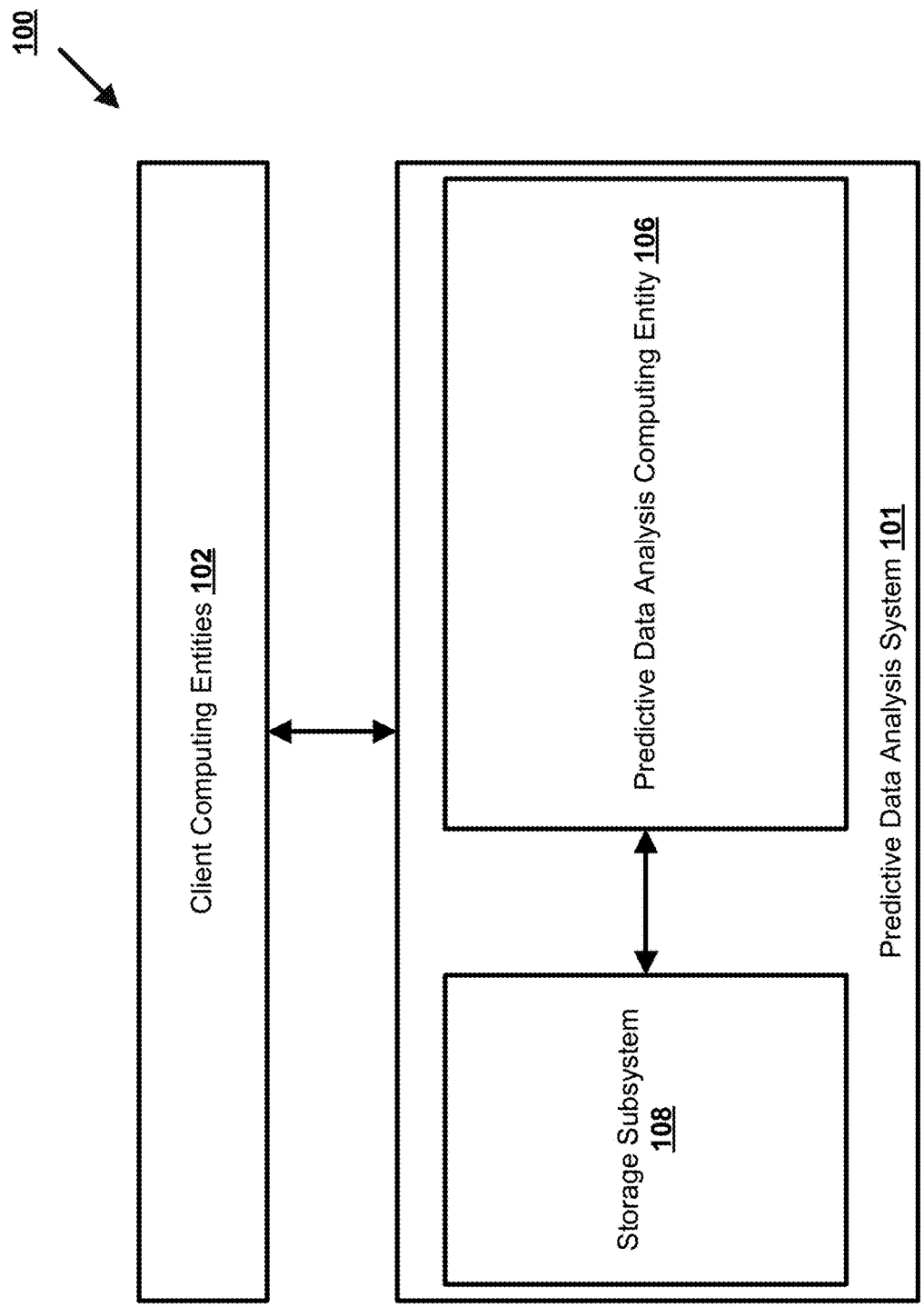

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
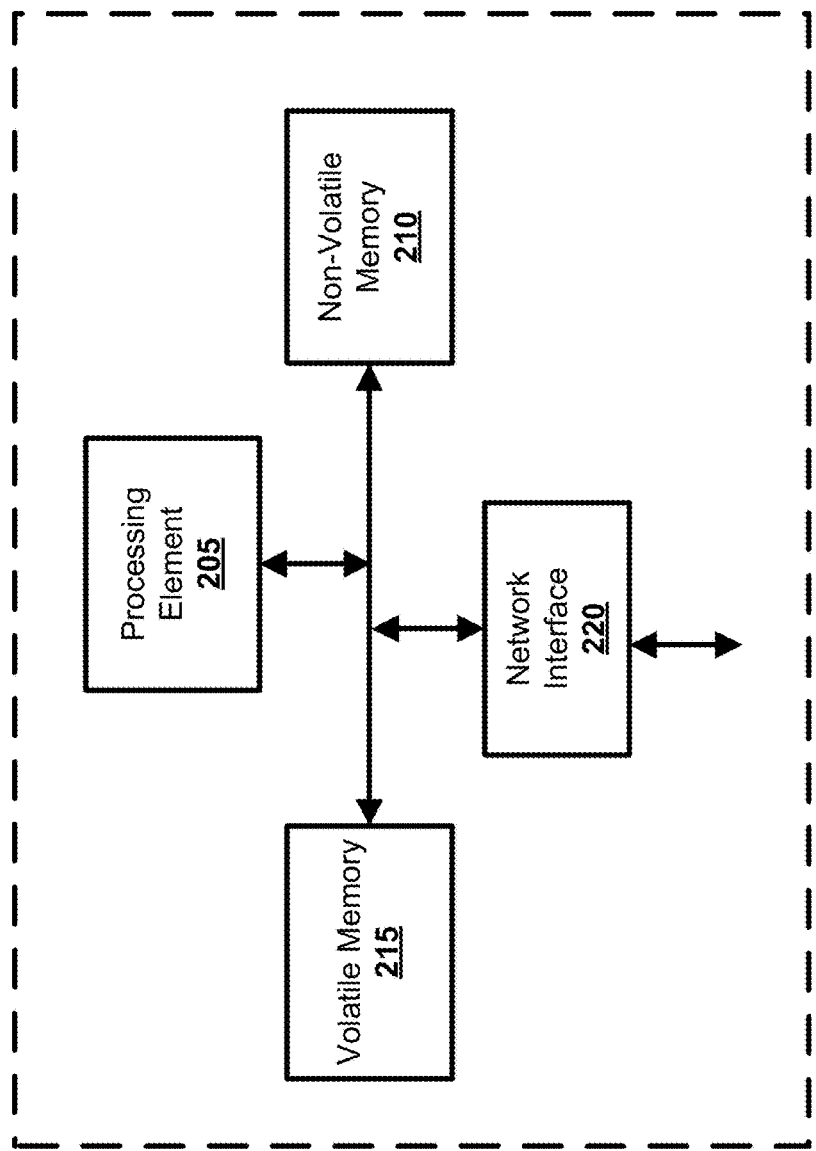

FIG. 2 provides an example predictive data analysis computing entity in accordance with some embodiments discussed herein.

Figure 3:
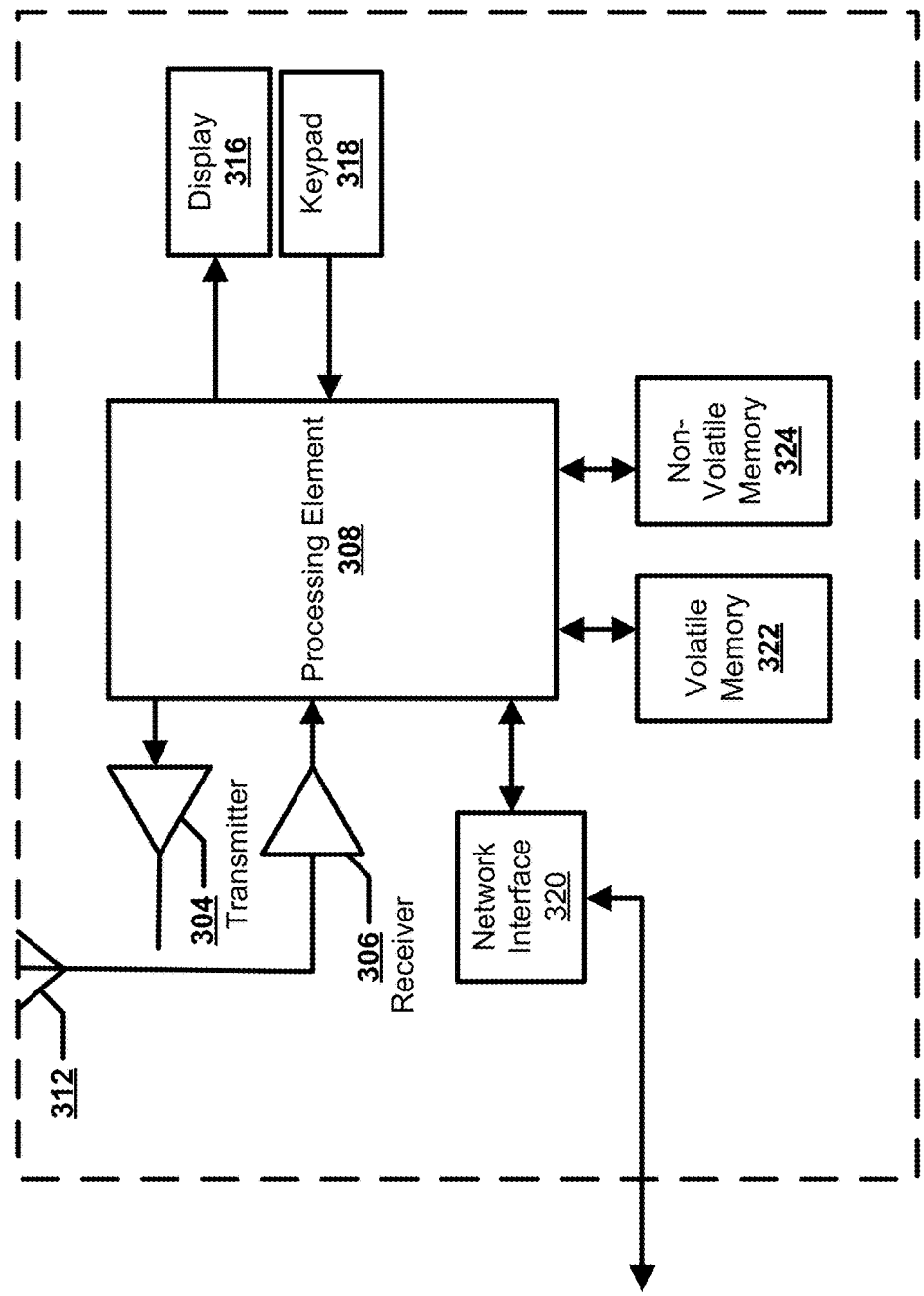

FIG. 3 provides an example client computing entity in accordance with some embodiments discussed herein.

Figure 4:
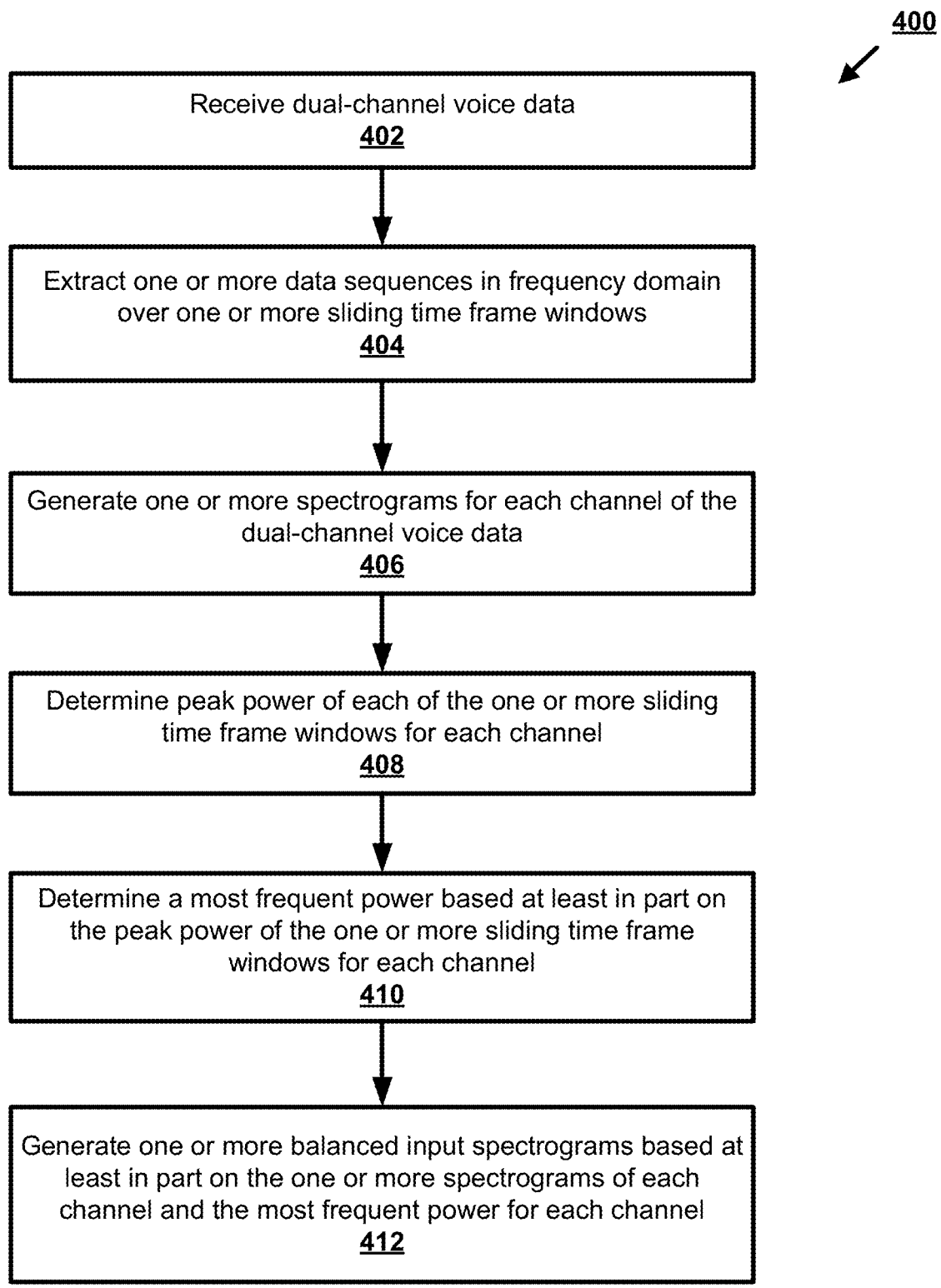

FIG. 4 is a flowchart diagram of an example process for pre-processing dual-channel audio data in accordance with some embodiments discussed herein.

Figure 5:
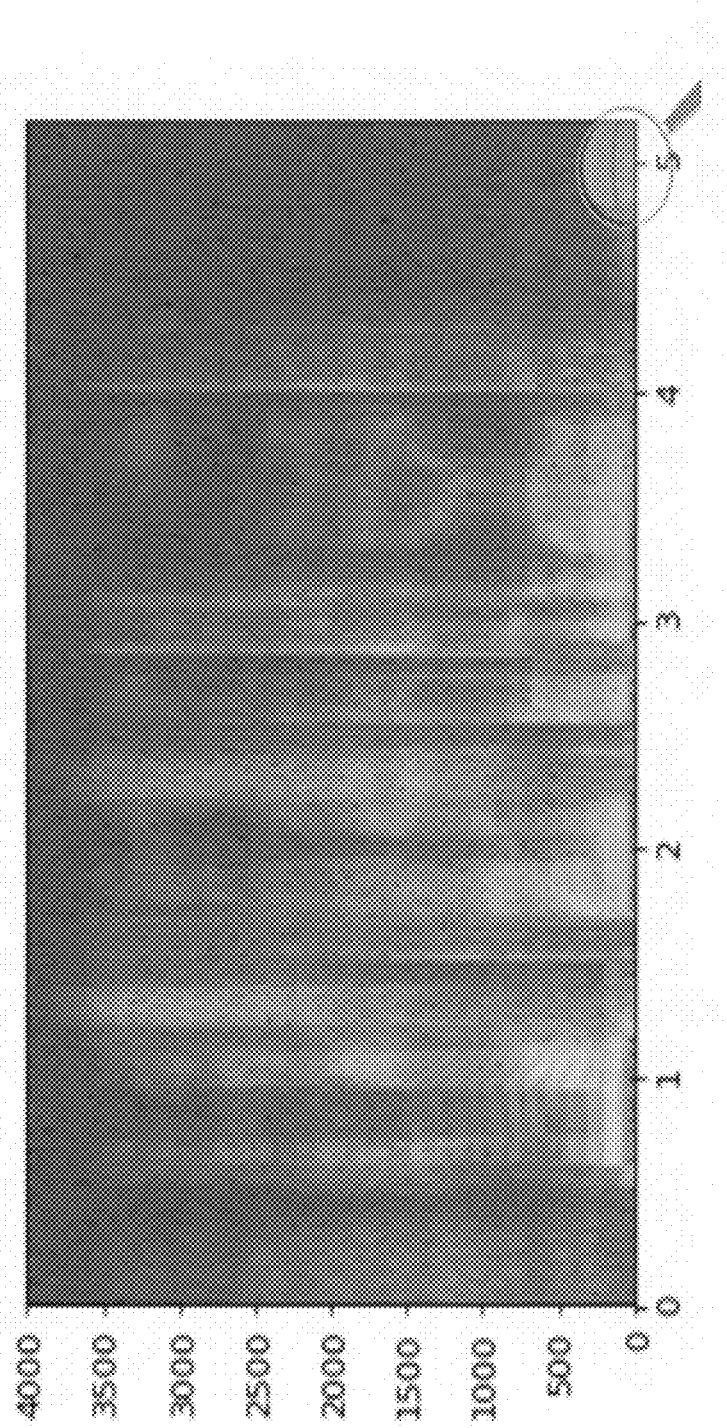

FIG. 5 provides an operational example of a spectrogram in accordance with some embodiments discussed herein.

Figure 6:
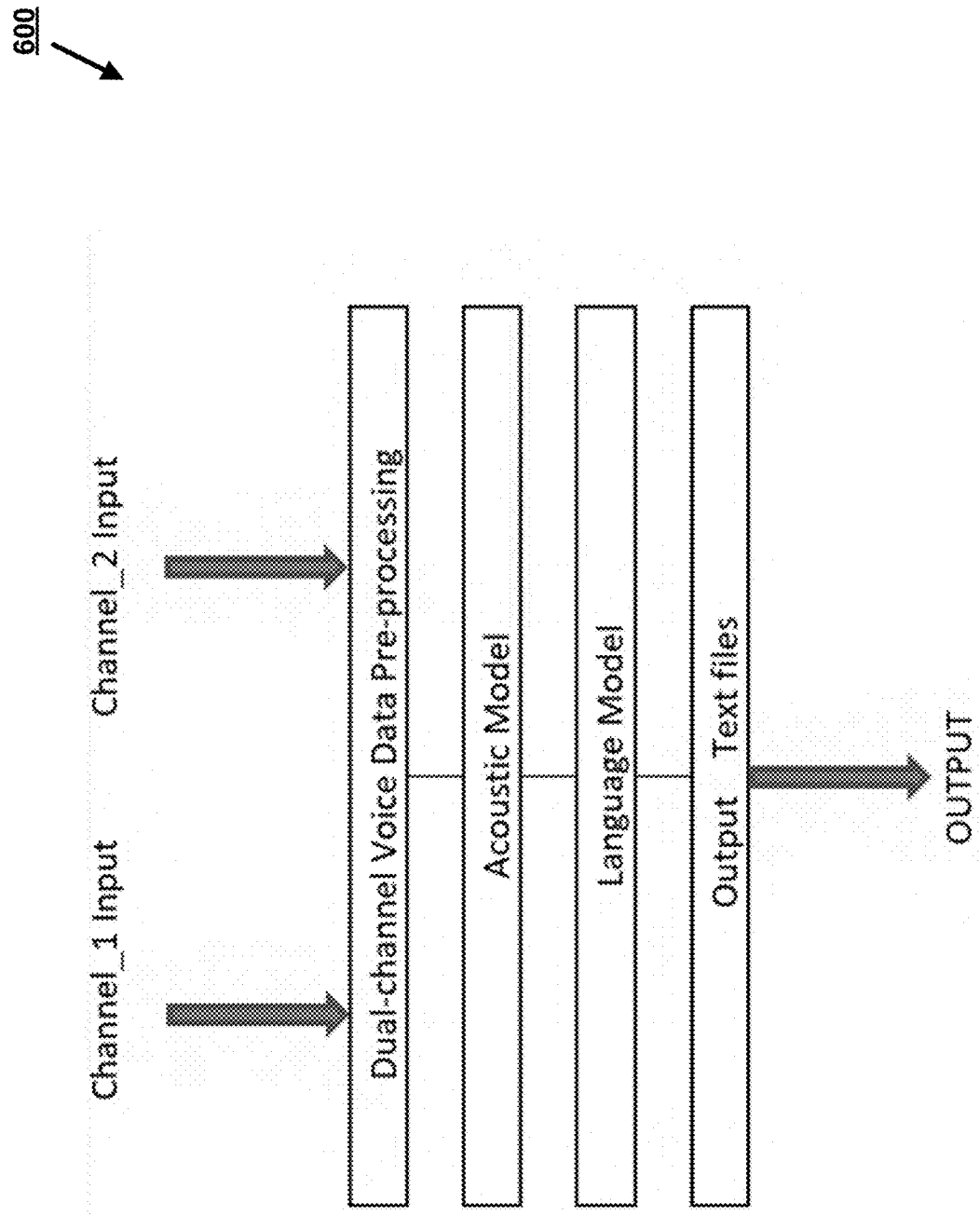

FIG. 6 provides an exemplary automatic speech recognition machine learning model architecture in accordance with some embodiments discussed herein.

Figure 7:
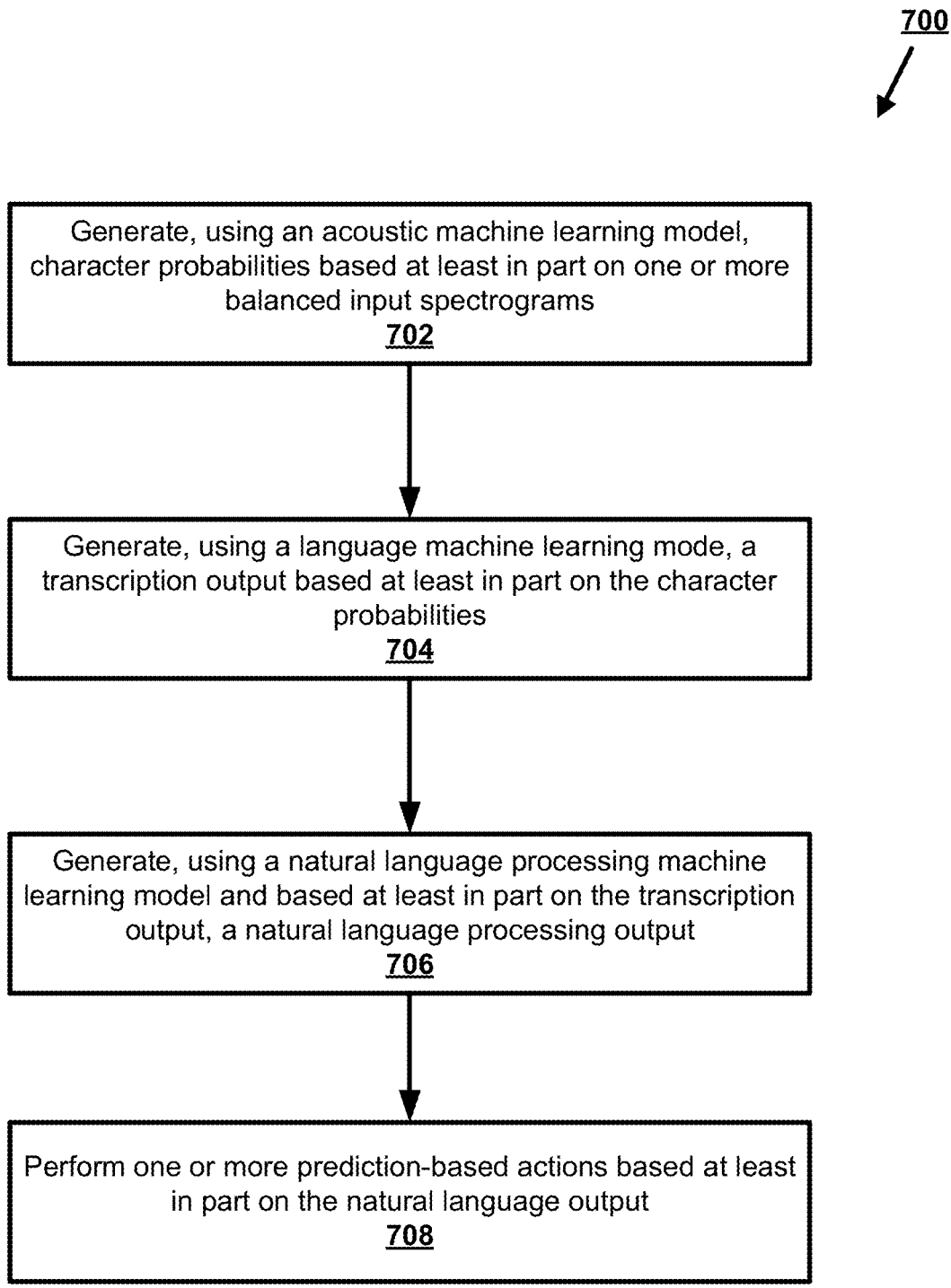

FIG. 7 is a flowchart diagram of an example process for performing predictive operations on pre-processed input dual-channel voice data in accordance with some embodiments discussed herein.

FIG. 8 provides an operational example of a prediction output user interface in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present disclosure make important technical contributions to improve predictive accuracy of automatic speech recognition machine learning models by pre-processing dual-channel voice data, which in turn improves training speed and training efficiency of training automatic speech recognition machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On—line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training machine learning models.

For example, various embodiments of the present disclosure improve predictive accuracy of automatic speech recognition machine learning models by balancing power of sounds in each channel of dual-channel voice data. As described herein, sounds from each of the channels may have different power characteristics. In particular, dual-channel voice data may comprise a sequence of audio frames including two independent channels corresponding to two separate speech sources. As such, each channel may introduce different variations in terms of power and frequency. Conventional automatic speech recognition models use simple averaging to pre-process dual-channel voice data. However, voice data with two channels is much more difficult to transcribe accurately using conventional automatic speech recognition due to variations in signal characteristics between each channel.

However, in accordance with various embodiments of the present disclosure, using an acoustic machine learning model to generate character probabilities based at least in part on a balanced input spectrogram associated with channels of dual-channel voice data can produce transcription outputs with higher accuracy. This technique will lead to higher accuracy of performing predictive operations as needed on certain sets of data. In doing so, the techniques described herein improve efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training automatic speech recognition machine learning models.

Moreover, various embodiments of the present disclosure make important technical contributions to improving resource-usage efficiency of post-prediction systems by using improved automatic speech recognition predictions to set the number of allowed computing entities used by the noted post-prediction systems. For example, in some embodiments, a predictive data analysis computing entity determines D word classifications for D word data objects based at least in part on the embedded representations for the D word data objects. Then, the count of word data objects that are associated with an affirmative word classification, along with a resource utilization ratio for each word data object, can be used to predict a predicted number of computing entities needed to perform post-prediction processing operations (e.g., label assignment of a call transcript) with respect to the D word data objects. For example, in some embodiments, the number of computing entities needed to perform post-prediction processing operations (e.g., label assignment of a call transcript) with respect to D word data objects can be determined based at least in part on the output of the equation:

$$R = \text{ceil}(\Sigma_k^{k=K} ur_k),$$

where R is the predicted number of computing entities needed to perform post-prediction processing operations with respect to the D word data object, ceil(•) is a ceiling function that returns the closest integer that is greater than or equal to the value provided as the input parameter of the ceiling function, k is an index variable that iterates over K word data objects among the D word data that are associated with affirmative classifications, and $ur_k$ is the estimated resource utilization ratio for a kth word data object that may be determined based at least in part on a count of utterances/tokens/words in the kth word data object. In some embodiments, once R is generated, the predictive data analysis computing entity can use R to perform operational load balancing for a server system that is configured to perform post-prediction processing operations (e.g., label assignment of a call transcript) with respect to D word data objects. This may be done by allocating computing entities to the post-prediction processing operations if the number of currently-allocated computing entities is below R, and deallocating currently-allocated computing entities if the number of currently-allocated computing entities is above R.

II. DEFINITIONS

The term "sliding time frame window" may refer to a data construct that describes a selective interval of time within a given time span. For example, a sliding time frame window may be applied to a signal to select a segment of the signal for analysis. In some embodiments, a sliding time frame window may comprise a window function. A window function may comprise a mathematical function that is zero-valued outside a chosen interval. A signal (e.g., from dual-channel voice data) may be multiplied by a window function to provides values of the signal within a given interval (i.e., where the signal and window function overlap) and zero values outside the given interval. Examples of window functions include Hamming window or a Hann window.

The term "power spectral density" (PSD) may refer to a data construct that describes how power of a signal is distributed over a frequency spectrum (e.g., a range of frequencies contained by the signal). PSD may provide a representation of power present in a signal as a function of frequency, per unit frequency. In some embodiments, the PSD may be obtained by applying, over one or more sliding time frame windows, a Fast Fourier transform (FFT) to dual-channel voice data comprising an audio signal to determine frequencies contained in each sliding time frame window and summing or integrating the frequencies for each sliding time frame window to provide a total power of the signal. Obtaining the PSD may further include performing one or more forward linear prediction estimates on one or more data sequences from the dual-channel voice data.

The term "spectrogram" may refer to a data construct that describes a feature matrix representative of a spectrum of frequencies of a waveform from a signal as the signal varies with time. According to various embodiments of the present disclosure, a spectrogram may comprise a PSD of a segment (e.g., defined by a sliding time frame window) of dual-channel voice data plotted over a certain time frame. A spectrogram may be usable by machine learning computing systems. For example, a spectrogram may be provided as input to a neural network of a machine learning model. In some embodiments, spectrograms of dual-channel voice data may be used by an acoustic machine learning model to output character probabilities by predicting phonemes corresponding to waveform sequences associated with the dual-channel voice data.

The term "balanced input spectrogram" may refer to a data construct that describes a spectrogram comprising a weighted combination of two or more spectrograms according to signal power. According to various embodiments of the present disclosure, a balanced input spectrogram may be generated to equalize signal characteristics of dual-channel voice data. In particular, dual-channel voice data may comprise audio signals from two channels generated from two sources corresponding to, for example, a telephone conversation between two individuals. As such, each channel may introduce different variations in terms of power and frequency. A balanced input spectrogram may compensate for the variations to enable better performance of analyzing the dual-channel voice data by, for example, an acoustic machine learning model.

The term "automatic speech recognition machine learning model" may refer to a data construct that describes parameters, hyperparameters, and/or defined operations of a machine learning model that is configured to process speech into text. In some embodiments of the present disclosure, an automatic speech recognition machine learning model may comprise dual-channel voice data pre-processing, an acoustic machine learning model, and a language machine learning model.

The term "acoustic machine learning model" may refer to a data construct that describes parameters, hyperparameters, and/or defined operations of a machine learning model that predicts which sound or phoneme is being spoken at each segment of an audio signal. An acoustic machine learning model may be trained to learn and classify acoustic patterns of speech. According to various embodiments of the present disclosure, the acoustic machine learning model may receive balanced input spectrograms from dual-channel voice data pre-processing and generate probabilities for characters using the balanced input spectrograms. Based at least in part on the character probabilities, the acoustic machine learning model may predict phonemes corresponding to given segments of an audio signal. A phoneme may comprise a distinct unit of sound that can distinguish one words from another in a particular language. In some embodiments, an acoustic machine learning model may comprise a neural network configured to generate character probabilities by receiving and processing output of dual-channel voice data pre-processing. For example, the neural network may comprise a LSTM RNN using an activation function that converts a vector of numbers into a vector of probabilities to produce character probabilities for a sequence of predicted characters. In some embodiments, the activation function may comprise the "softmax" function.

The term "language machine learning model" may refer to a data construct that describes parameters, hyperparameters, and/or defined operations of a machine learning model that predicts a sequence of words based at least in part on a given sequence of phonemes. A language machine learning model may be trained to learn sequences of words that are most likely to be spoken based at least in part on grammar and context. Training of the language machine learning model may comprise creating associations between audio recordings and ground-truth transcripts of the recordings. A language machine learning model may be used to make predictions based at least in part on output from an acoustic machine learning model. According to various embodiments of the present disclosure, a transcription output may be generated, using a language machine learning model, based at least in part on character probabilities generated from an acoustic machine learning model. For example, a language machine learning model may analyze a sequence of phonemes predicted by an acoustic machine learning model and perform statistical probability analysis to deduce whole words from the predicted phonemes and from there sentences. As such, a language machine learning model may determine which words follow on from current words and with what probability. In certain embodiments, the language machine learning model may also guide or correct predictions made by the acoustic machine learning model, such as discarding predictions which are improbable given constraints of proper grammar and topic of discussion.

The term "transcription output" may refer to a data construct that describes a sequence of words predicted by a language machine learning model based at least in part on phonemes predicted by an acoustic machine learning model. A transcription output may include one or more words and/or sentences. In some embodiments, a transcription out may comprise a transcript of an audio recording, such as a recorded call dialog. The transcription output may also be based at least in part on a given natural language identified by the language machine learning model.

The term "natural language processing machine learning model" may refer to a data construct that describes parameters, hyperparameters, and/or defined operations of a machine learning model that is configured to process text to recognize and understand the contents of the text. For example, a natural language processing machine learning model may analyze text converted from audio data by an automatic speech recognition machine learning model. A natural language processing machine learning model may be trained to understand a natural language of text received including any contextual nuances of the natural language within the text. Generally, a natural language processing machine learning model may simulate how humans comprehend speech and respond accordingly. Processing performed by a natural language processing machine learning model to recognize and understand meaning of text may be used for performing useful tasks. In some embodiments, a natural language processing machine learning model may be programmed to react to particular keywords that give context (e.g., contextual clues). Based at least in part on the keywords, the natural language processing machine learning model can narrow what is being said and which words are being used in order to respond. According to various embodiments of the present disclosure, a natural language processing output may be generated, using a natural language processing machine learning model and based at least in part on a transcription output generated by a language machine learning model. The natural language processing output may be used by one or more processors to perform one or more prediction-based actions.

The term "natural language processing output" may refer to a data construct that describes an inferred text classification.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating a quality assurance score for a recorded call dialog. For example, in accordance with various embodiments of the present disclosure, using an acoustic machine learning model to generate character probabilities based at least in part on a balanced input spectrogram associated with channels of dual-channel voice data can produce transcription outputs with higher accuracy. This technique will lead to higher accuracy of performing predictive operations as needed on certain sets of data. In doing so, the techniques described herein improve efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training automatic speech recognition machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure make important technical contributions to improve predictive accuracy of automatic speech recognition machine learning models by pre-processing dual-channel voice data, which in turn improves training speed and training efficiency of training automatic speech recognition machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training machine learning models.

FIG. 4 is a flowchart diagram of an example process 400 for pre-processing input dual-channel voice data, such as a dual-channel 8 kHz telephone recording, by an automatic speech recognition machine learning model. Via the various steps/operations of the process 400, the predictive data analysis computing entity 106 can pre-process the dual-channel voice data to generate one or more balanced input spectrograms and use an acoustic machine learning model, to generate character probabilities based at least in part on the one or more balanced input spectrograms.

The process 400 begins at step/operation 402 when the predictive data analysis computing entity 106 receives dual-channel voice data. The dual-channel voice data may comprise a sequence of audio frames including two independent channels corresponding to two separate speech sources. As such, each channel of input sound signal may introduce different variations in power and frequency.

At step/operation 404, the predictive data analysis computing entity 106, for each channel of the dual-channel voice data, extracts one or more data sequences in frequency domain from the dual-channel voice data over one or more sliding time frame windows by applying FFT to the dual-channel voice data.

In some embodiments, a sliding time frame window describes a selective interval of time within a given time span. For example, a sliding time frame window may be applied to a signal of the dual-channel voice data to select a segment of the signal for analysis. In some embodiments, a sliding time frame window may comprise a window function. A window function may comprise a mathematical function that is zero-valued outside a chosen interval. A signal (e.g., from the dual-channel voice data) may be multiplied by a window function to provides values of the signal within a given interval (i.e., where the signal and window function overlap) and zero values outside the given interval. Examples of window functions include Hamming window or a Hann window.

For example, a specific sliding time frame window of the dual-channel voice data, at time t, may be denoted as $W_t$. A data sequence $x(n)$ in frequency domain (with samples $n=0$ to $N-1$) may be obtained by applying FFT to the dual-channel voice data in $W_t$. The FFT may be used to provide overall frequency components for the dual-channel voice data as a whole over one or more sliding time frame windows. In particular, the FFT may decompose signals in the dual-channel voice data into their constituent frequencies and amplitudes present in their respective sliding time frame windows.

At step/operation 406, the predictive data analysis computing entity 106 generates one or more spectrograms for each channel of the dual-channel voice data. Accordingly, in some embodiments, a spectrogram may comprise a PSD waveform obtained by performing one or more forward linear prediction estimates on the one or more data sequences.

In some embodiments, PSD describes how power of a signal is distributed over a frequency spectrum (e.g., a range of frequencies contained by the signal). PSD may provide a representation of power present in a signal as a function of frequency, per unit frequency. In some embodiments, the PSD may be obtained by applying, over one or more sliding time frame windows, a FFT to dual-channel voice data comprising an audio signal to determine frequencies contained in each sliding time frame window and summing or integrating the frequencies for each sliding time frame window to provide a total power of the signal. Obtaining the PSD may further include performing one or more forward linear prediction estimates on one or more data sequences from the dual-channel voice data.

In some embodiments, a spectrogram describes a feature matrix representative of a spectrum of frequencies of a waveform from a signal as the signal varies with time. According to various embodiments of the present disclosure, a spectrogram may comprise a PSD of a segment (e.g., data sequence x(n) defined by sliding time frame window $W_t$) of dual-channel voice data plotted over a certain time frame. A spectrogram may be usable by machine learning computing systems. For example, a spectrogram may be provided as input to a neural network of a machine learning model. In some embodiments, spectrograms of dual-channel voice data may be used by an acoustic machine learning model to output character probabilities by predicting phonemes corresponding to waveform sequences associated with the dual-channel voice data.

According to some embodiments, the PSD may be obtained via the Burg Method. The Burg model may fit an autoregressive model to, for example, the data sequence x(n) by minimizing forward and backward prediction errors and using Levinson-Durbin recursion. In some embodiments, forward linear prediction estimates of order m for estimating amplitude of data sequence x(n) may be obtained according to the following Equations 1 and 2:

$$\hat{x}(n) = -\sum_{k=1}^{m} a_m(k)x(n-k) \qquad \text{Equation 1}$$

$$\hat{x}(n-m) = -\sum_{k=1}^{m} a_m(k)\hat{x}(n+k-m) \qquad \text{Equation 2}$$

where $a_m(k)$ may represent prediction coefficients with k=0 to m−1, and m=1 top number of past samples.

In some embodiments, the corresponding forward and backward errors $f_m(n)$ and $b_m(n)$ can be defined according to Equations 3 and 4 as:

$$f_m(n)=x(n)-\hat{x}(n) \qquad \text{Equation 3}$$

$$b_m(n)=x(n-m)-\hat{x}(n-m) \qquad \text{Equation 4}$$

In some embodiments, the least squares error $\xi_m$ can be determined according to Equation 5:

$$\xi_m = \min \sum_{n=m}^{K-1} \left[(f_m(n))^2 + (b_m(n))^2\right] \qquad \text{Equation 5}$$

In some embodiments, the error may be minimized by selecting the prediction coefficients $a_m(k)$ as follows according to Equation 6:

$$a_m(k)=a_{m-1}(k)+\lambda_m a_{m-1}(m-k) \qquad \text{Equation 6}$$

with $1 \leq k \leq m-1$ and $\lambda_m = a_m(m)$, which represents the mth reflection coefficient. In some embodiments, minimizing the least square error $\xi_m$ with respect to the complex valued function $\lambda_m$ (using the Levinson-Durbin algorithm) may provide Equation 7:

$$\lambda_m = \frac{-\sum_{n=m}^{N-1}[f_{m-1}(n)b_{m-1}(n)]}{\frac{1}{2}\sum_{n=m}^{N-1}\left[(f_{m-1}(n))^2 + (b_{m-1}(n))^2\right]}. \qquad \text{Equation 7}$$

Combining Equations 6 and 7 may determine the coefficient $a_m(k)$ for Equation (1), which may be used to generate a PSD waveform that estimates the power spectrum based at least in part on frequency.

The PSD waveform may be plotted against time to generate a spectrogram. An operational example of a spectrogram 500 comprising a graphic representation of the frequency and intensity of an exemplary audio data sequence over time is depicted in FIG. 5. As depicted in FIG. 5, in some embodiments, the x-axis may represent time associated with the length of the data sequence. The y-axis may represent a span of frequencies included in the audio data sequence. The amplitude of frequencies in the audio data sequence may be represented by a contrast between a background color and a color of a sound spectra.

Returning to FIG. 4, at step/operation 408, the predictive data analysis computing entity 106 determines peak power of each of the one or more sliding time frame windows for each channel. In some embodiments, peak power for a sliding time frame window $W_t$ in an input sequence of $\{W_1, W_2, \ldots, W_t, \ldots, W_T\}$ may be obtained by the following Equation 8:

$$P_{Wt}=\max(\hat{x}(n)) \qquad \text{Equation 8}$$

The peak power of a plurality of sliding time frame windows may be obtained to create a vector of $\{Pw_1, Pw_2, \ldots, Pw_t, \ldots, Pw_T\}$ for peak powers.

At step/operation 410, the predictive data analysis computing entity 106 determines a most frequent power (MFP) based at least in part on the peak power of the one or more sliding time frame windows for each channel. Determining the MFP may comprise generating a histogram of peak powers for the vector $\{Pw_1, Pw_2, \ldots, Pw_t, \ldots, Pw_T\}$ and using a same or similar method as the PSD Burg Method to smooth the profile of the histogram. In some embodiments, the MFP within the vector $\{Pw_1, Pw_2, \ldots, Pw_t, \ldots, Pw_T\}$ of each channel may be obtained according to the following Equations 9 and 10:

$$P_{channel\_0}=PD(P_{W1}, \ldots, P_{Wt}, \ldots, P_{WT}) \text{ for Channel\_0} \qquad \text{Equation 9}$$

$$P_{channel\_1}=PD(P_{W1}, \ldots, P_{Wt}, \ldots, P_{WT}) \text{ for Channel\_1} \qquad \text{Equation 10}$$

where the function PD( ) may comprise a peak detect function to locate where is the highest frequency of power in the histogram of peak powers for vector $\{Pw_1, Pw_2, \ldots, Pw_T\}$.

At step/operation 412, the predictive data analysis computing entity 106 generates one or more balanced input spectrograms based at least in part on the one or more spectrograms of each channel and the most frequent power for each channel.

In some embodiments, a balanced input spectrogram describes a spectrogram comprising a weighted combination of two or more spectrograms according to signal power. According to various embodiments of the present disclosure, a balanced input spectrogram may be generated to equalize signal characteristics of dual-channel voice data. In particular, dual-channel voice data may comprise audio signals from two channels generated from two sources corresponding to, for example, a telephone conversation between two individuals. As such, each channel may introduce different variations in terms of power and frequency. A balanced input spectrogram may compensate for the variations to enable better performance of analyzing the dual-channel voice data by, for example, an acoustic machine learning model.

In some embodiments, the balanced input spectrogram may be obtained by the following Equation 11:

$$S = S_{channel_0} + \frac{P_{channel\_0}}{P_{channel\_1}} * S_{channel\_1} \quad \text{Equation 11}$$

In the above equation, spectrograms for each channel are denoted as $S_{channel\_0}$ and $S_{channel\_1}$, respectively.

The example process 400 for pre-processing input dual-channel voice data may be included in an automatic speech recognition machine learning model. In some embodiments, an automatic speech recognition machine learning model describes parameters, hyperparameters, and/or defined operations of a machine learning model that is configured to process speech from dual-channel voice data into text files. In some embodiments, the automatic speech recognition machine learning model 600 has the architecture that is depicted in FIG. 6. As further depicted in FIG. 6, the automatic speech recognition machine learning model model 600 comprises dual-channel voice data pre-processing, an acoustic machine learning model, and a language machine learning model.

FIG. 7 is a flowchart diagram of an example process 700 for performing predictive operations on pre-processed input dual-channel voice data.

At step/operation 702, the predictive data analysis computing entity 106 generates, using an acoustic machine learning model, character probabilities based at least in part on one or more balanced input spectrograms associated with dual-channel voice data.

In some embodiments, an acoustic machine learning model describes parameters, hyperparameters, and/or defined operations of a machine learning model that predicts which sound or phoneme is being spoken at each segment of an audio signal. An acoustic machine learning model may be trained to learn and classify acoustic patterns of speech. According to various embodiments of the present disclosure, the acoustic machine learning model may receive balanced input spectrograms from dual-channel voice data pre-processing and generate probabilities for characters using the balanced input spectrograms. Based at least in part on the character probabilities, the acoustic machine learning model may predict phonemes corresponding to given segments of an audio signal. A phoneme may comprise a distinct unit of sound that can distinguish one words from another in a particular language. In some embodiments, an acoustic machine learning model may comprise a neural network configured to generate character probabilities by receiving and processing output of dual-channel voice data pre-processing. For example, the neural network may comprise a LSTM RNN using an activation function that converts a vector of numbers into a vector of probabilities to produce character probabilities for a sequence of predicted characters. In some embodiments, the activation function may comprise the "softmax" function.

According to various embodiments of the present disclosure, the one or more balanced input spectrograms may be provided as input to a LSTM RNN model. Output data of the LSTM RNN (with balanced input spectrogram S) may be set to hidden layer vector h according to the following Equation 12:

$$h = \text{LSTM}(S) \quad \text{Equation 12}$$

The output layer of the LSTM RNN may use softmax as the activation function with its own different weight coefficients W' of a (N×M) matrix. Ignoring the bias term, the probability distribution of a single character)), can be obtained according to the following Equation 13:

$$P(y = y_i | x) = \frac{\exp((W'_i)^T * h)}{\sum_{j=1}^{M} \exp((W'_j)^T * h)} \quad \text{Equation 13}$$

where $W'_i$ and $W'_j$ represent the ith and the jth column vectors of the trained weight coefficient matrix W' respectively, W' represents the weight matrix before the output layer, h is defined in Equation 12, and T represents a transpose operation. The Loss Function can be expressed as Equation 14:

$$L(y, y\_hat) = -\sum_{i=1}^{M} (y_i \times \log(y_i\_hat)) \quad \text{Equation 14}$$

where yi_hat represents the model predicted value and $y_i$ represents the ground truth value in labels (e.g., of the character set) respectively.

However, as described herein, in accordance with various embodiments of the present disclosure, using an acoustic machine learning model to generate character probabilities based at least in part on a balanced input spectrogram associated with channels of dual-channel voice data can produce transcription outputs with higher accuracy. This technique will lead to higher accuracy of performing predictive operations as needed on certain sets of data. In doing so, the techniques described herein improve efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training automatic speech recognition machine learning models.

At step/operation 704, the predictive data analysis computing entity 106 generates, using a language machine learning model, a transcription output based at least in part on the character probabilities.

In some embodiments, a language machine learning model describes parameters, hyperparameters, and/or defined operations of a machine learning model that predicts a sequence of words based at least in part on a given sequence of phonemes. A language machine learning model may be trained to learn sequences of words that are most likely to be spoken based at least in part on grammar and context. Training of the language machine learning model may comprise creating associations between audio recordings and ground-truth transcripts of the recordings. A language machine learning model may be used to make predictions based at least in part on output from an acoustic machine learning model. As an example, a language machine learning model may analyze a sequence of phonemes predicted by an acoustic machine learning model and perform statistical probability analysis to deduce whole words from the predicted phonemes and from there complete sentences. As such, a language machine learning model may determine which words follow on from current words and with what probability. In certain embodiments, the language machine learning model may also guide or correct predictions made by the acoustic machine learning model, such as discarding predictions which are improbable given constraints of proper grammar and topic of discussion.

In some embodiments, a transcription output describes a sequence of words predicted by a language machine learning model based at least in part on phonemes predicted by an acoustic machine learning model. A transcription output may include one or more words and/or sentences. In some embodiments, a transcription out may comprise a transcript of an audio recording, such as a recorded call dialog. The transcription output may also be based at least in part on a given natural language identified by the language machine learning model.

At step/operation 706, the predictive data analysis computing entity 106 generates, using a natural language processing machine learning model and based at least in part on the transcription output, a natural language processing output. In some embodiments, a natural language processing output describes an inferred text classification.

In some embodiments, a natural language processing machine learning model describes parameters, hyperparameters, and/or defined operations of a machine learning model that is configured to process text to recognize and understand the contents of the text. For example, a natural language processing machine learning model may analyze text converted from audio data by an automatic speech recognition machine learning model. A natural language processing machine learning model may be trained to understand a natural language of text received including any contextual nuances of the natural language within the text. Generally, a natural language processing machine learning model may simulate how humans comprehend speech and respond accordingly. Processing performed by a natural language processing machine learning model to recognize and understand meaning of text may be used for performing useful tasks. In some embodiments, a natural language processing machine learning model may be programmed to react to particular keywords that give context (e.g., contextual clues). Based at least in part on the keywords, the natural language processing machine learning model can narrow what is being said and which words are being used in order to respond.

At step/operation 708, the predictive data analysis computing entity 106 performs one or more prediction-based actions based at least in part on the natural language processing output. In some embodiments, the transcription output is an unlabeled document data object, the natural language processing output is a document classification/label for the unlabeled document data object, and the prediction-based actions are performed based at least in part on the classification/label. In some embodiments, performing the one or more prediction-based actions based at least in part on the label assignment for an unlabeled document data object includes displaying the one or more label assignment for an unlabeled document data object using a prediction output user interface, such as the prediction output user interface 800 of FIG. 8. As depicted in FIG. 8, the prediction output user interface 800 displays keywords or classification labels for a transcript of an audio recording of a telephone call (the unlabeled document data object).

In some embodiments, performing the prediction-based actions include performing load balancing operations for a post-prediction system. For example, various embodiments of the present disclosure make important technical contributions to improving resource-usage efficiency of post-prediction systems by using improved automatic speech recognition predictions to set the number of allowed computing entities used by the noted post-prediction systems. For example, in some embodiments, a predictive data analysis computing entity determines D word classifications for D word data objects based at least in part on the embedded representations for the D word data objects. Then, the count of word data objects that are associated with an affirmative word classification, along with a resource utilization ratio for each word data object, can be used to predict a predicted number of computing entities needed to perform post-prediction processing operations (e.g., label assignment of a call transcript) with respect to the D word data objects. For example, in some embodiments, the number of computing entities needed to perform post-prediction processing operations (e.g., label assignment of a call transcript) with respect to D word data objects can be determined based at least in part on the output of the equation: $R=\text{ceil}(\Sigma_k^{k=K} ur_k)$, where R is the predicted number of computing entities needed to perform post-prediction processing operations with respect to the D word data object, ceil(•) is a ceiling function that returns the closest integer that is greater than or equal to the value provided as the input parameter of the ceiling function, k is an index variable that iterates over K word data objects among the D word data that are associated with affirmative classifications, and $ur_k$ is the estimated resource utilization ratio for a kth word data object that may be determined based at least in part on a count of utterances/tokens/words in the kth word data object. In some embodiments, once R is generated, the predictive data analysis computing entity can use R to perform operational load balancing for a server system that is configured to perform post-prediction processing operations (e.g., label assignment of a call transcript) with respect to D word data objects. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present disclosure make important technical contributions to improve predictive accuracy of automatic speech recognition machine learning models by pre-processing dual-channel voice data, which in turn improves training speed and training efficiency of training automatic speech recognition machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training automatic speech recognition machine learning models, thus reducing the number of computational operations needed and/or the amount of training data entries needed to train automatic speech recognition machine learning models. Accordingly, the techniques described herein improve at least one of the computational efficiency, storage-wise efficiency, and speed of training machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for automatic speech recognition, the computer-implemented method comprising:
    receiving, by one or more processors, dual-channel voice data;
    for each channel of the dual-channel voice data, extracting, using the one or more processors, one or more data sequences in frequency domain from the dual-channel voice data over one or more sliding time frame windows by applying fast Fourier transformation to the dual-channel voice data;
    generating, by the one or more processors, one or more spectrograms for each channel, a spectrogram comprising a power spectral density (PSD) waveform obtained by performing one or more forward linear prediction estimates on the one or more data sequences;
    determining, by the one or more processors, peak power of each of the one or more sliding time frame windows for each channel;
    determining, by the one or more processors, a most frequent power (MFP) based at least in part on the peak power of the one or more sliding time frame windows for each channel;
    generating, by the one or more processors, one or more balanced input spectrograms based at least in part on the one or more spectrograms of each channel and the most frequent power for each channel;
    generating, by the one or more processors using an acoustic machine learning model, character probabilities based at least in part on the one or more balanced input spectrograms;
    generating, by the one or more processors using a language machine learning model, a transcription output based at least in part on the character probabilities;
    generating, by the one or more processors using a natural language processing machine learning model, and based at least in part on the transcription output, a natural language processing output for the dual-channel voice data; and
    performing, by the one or more processors, one or more prediction-based actions based at least in part on the natural language processing output.

2. The computer-implemented method of claim 1, wherein the one or more sliding time frame windows comprise Hamming windows.

3. The computer-implemented method of claim 1, wherein the one or more forward linear prediction estimates comprise the Burg Method.

4. The computer-implemented method of claim 1, wherein the PSD waveform is representative of an estimate of power spectrum based at least in part on frequency.

5. The computer-implemented method of claim 1, wherein determining the MFP further comprises locating highest frequency of power in the one or more sliding time frame windows for each channel.

6. The computer-implemented method of claim 1, wherein the dual-channel voice data comprises 8 KHz telephone recording voice data.

7. The computer-implemented method of claim 1, further comprising predicting phonemes based at least in part on the character probabilities.

8. A system for performing speech recognition processing, the apparatus comprising one or more processors and memory including program code, the memory and the program code configured to, with the one or more processors, cause the apparatus to at least:
    receive dual-channel voice data;
    for each channel of the dual-channel voice data, extract one or more data sequences in frequency domain from the dual-channel voice data over one or more sliding time frame windows by applying fast Fourier transformation to the dual-channel voice data;
    generate one or more spectrograms for each channel, a spectrogram comprising a power spectral density (PSD) waveform obtained by performing one or more forward linear prediction estimates on the one or more data sequences;
    determine peak power of each of the one or more sliding time frame windows for each channel;
    determine a most frequent power (MFP) based at least in part on the peak power of the one or more sliding time frame windows for each channel;
    generate one or more balanced input spectrograms based at least in part on the one or more spectrograms of each channel and the most frequent power for each channel;
    generate, using an acoustic machine learning model, character probabilities based at least in part on the one or more balanced input spectrograms;
    generate, using a language machine learning model, a transcription output based at least in part on the character probabilities;
    generate, using a natural language processing machine learning model and based at least in part on the transcription output, a natural language processing output for the dual-channel voice data; and
    perform, by one or more processors, one or more prediction-based actions based at least in part on the natural language processing output.

9. The system of claim 8, wherein the one or more sliding time frame windows comprise Hamming windows.

10. The system of claim 8, wherein the one or more forward linear prediction estimates comprise the Burg Method.

11. The system of claim 8, wherein the PSD waveform is representative of an estimate of power spectrum based at least in part on frequency.

12. The system of claim 8, wherein to determine the MFP, the memory and the program code are further configured to, with the one or more processors, cause the apparatus to locate highest frequency of power in the one or more sliding time frame windows for each channel.

13. The system of claim 8, wherein the dual-channel voice data comprises 8 KHz telephone recording voice data.

14. The system of claim 8, wherein the memory and the program code are further configured to, with the one or more processors, cause the apparatus to predict phonemes based at least in part on the character probabilities.

15. A computer program product for performing speech recognition processing, the computer program product comprising at least one non-transitory computer-readable storage medium having computer-readable program code portions stored therein, the computer-readable program code portions configured to:
- receive dual-channel voice data;
- for each channel of the dual-channel voice data, extract one or more data sequences in frequency domain from the dual-channel voice data over one or more sliding time frame windows by applying fast Fourier transformation to the dual-channel voice data;
- generate one or more spectrograms for each channel, a spectrogram comprising a power spectral density (PSD) waveform obtained by performing one or more forward linear prediction estimates on the one or more data sequences;
- determine peak power of each of the one or more sliding time frame windows for each channel;
- determine a most frequent power (MFP) based at least in part on the peak power of the one or more sliding time frame windows for each channel;
- generate one or more balanced input spectrograms based at least in part on the one or more spectrograms of each channel and the most frequent power for each channel;
- generate, using an acoustic machine learning model, character probabilities based at least in part on the one or more balanced input spectrograms;
- generate, using a language machine learning model, a transcription output based at least in part on the character probabilities;
- generate, using a natural language processing machine learning model and based at least in part on the transcription output, a natural language processing output for the dual-channel voice data; and
- perform, by one or more processors, one or more prediction-based actions based at least in part on the natural language processing output.

16. The computer program product of claim 15, wherein the one or more sliding time frame windows comprise Hamming windows.

17. The computer program product of claim 15, wherein the one or more forward linear prediction estimates comprise the Burg Method.

18. The computer program product of claim 15, wherein the PSD waveform is representative of an estimate of power spectrum based at least in part on frequency.

19. The computer program product of claim 15, wherein to determine the MFP, the computer-readable program code portions are further configured to to locate highest frequency of power in the one or more sliding time frame windows for each channel.

20. The computer program product of claim 15, wherein the dual-channel voice data comprises 8 KHz telephone recording voice data.

* * * * *

UNITED STATES PATENT AND TRADEMARK OFFICE
CERTIFICATE OF CORRECTION

PATENT NO. : 12,154,589 B2
APPLICATION NO. : 17/930567
DATED : November 26, 2024
INVENTOR(S) : James J. Mou et al.

Page 1 of 1

It is certified that error appears in the above-identified patent and that said Letters Patent is hereby corrected as shown below:

In the Claims

In Column 26, Line 20, Claim 19, delete "to to" and insert -- to --, therefor.

Signed and Sealed this
Eleventh Day of February, 2025

Coke Morgan Stewart
*Acting Director of the United States Patent and Trademark Office*